United States Patent Office 3,234,306
Patented Feb. 8, 1966

3,234,306
THIOPHOSPHINIC ACID ESTERS
Reimer Cölln, Wuppertal-Elberfeld, and Gerhard Schrader, Wuppertal-Cronenberg, Germany, assignors to Farbenfabriken Bayer Aktiengesellschaft, Leverkusen, Germany, a German corporation
No Drawing. Filed Aug. 2, 1961, Ser. No. 128,685
Claims priority, application Germany, Aug. 13, 1960, F 31,879
14 Claims. (Cl. 260—954)

This application is a continuation-in-part of application Serial No. 797,834, filed on March 9, 1959.

The present invention relates to and has as its objects new and useful insecticides and process for their production. The new compounds of this invention are thiophosphinic acid esters of the following general formula

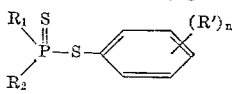

wherein R′, $R_1$ and $R_2$ stand for preferably lower alkyl radicals, whilst $(R')_n$ denotes lower alkyl groups, nitro groups or halogen atoms, n being a figure between 1 and 5.

The production of S-nitro-phenyl-O,O-dialkyl-thiophosphoric acid esters by condensation of dialkyl phosphites with nitrophenyl-sulfenic acid chlorides and the reaction of the corresponding dialkyl-thiophosphites with nitrophenyl-sulfenic acid chlorides leading to O,O-dialkyl-S-nitrophenyl-thionothiolphosphoric acid esters is already known from the literature.

In accordance with the present invention it has now been found that the analogously structured dialkyl-thiolphosphinites react in the same manner with nitrated or halogenated aryl-sulfenic acid chlorides with splitting off hydrogen chloride and formation of dialkyl-S-nitro- or -S-halo-phenyl-thionothiolphosphinic acid esters which are likewise distinguished by outstanding insecticidal properties.

The dialkyl-thiolphosphinites or dialkyl-phosphine sulfides required as starting material for the process according to the present invention

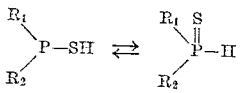

can be easily produced by alkaline hydrolysis of the corresponding bis-dialkyl-sulfides.

The process of the present invention may be illustrated by the following equation:

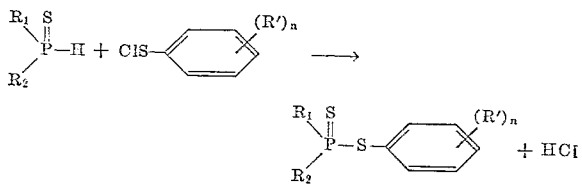

wherein R′, $R_1$ and $R_2$, and n have the same significance as given above.

The formation of the dithiophosphinic acid esters obtainable according to this process proceeds smoothly and with good yields. The exothermic reaction is expediently carried out at temperatures between 0 and 30° C. and in the presence of suitable inert solvents or diluents. As such there are chiefly to be considered chlorinated hydrocarbons, for example, methylene chloride. The hydrochloric acid set free in the course of the reaction can subsequently be removed by washing the reaction mixture with water. The products of the process can be easily purified by simple recrystallization if they are not already obtained in a very pure form.

The new compounds of the present invention very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols, such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As an example for the special utility of the present invention the compound of the following formula

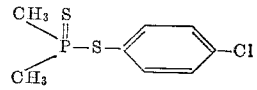

has been tested against caterpillars.

Aqueous dilutions of these compounds have been prepared by admixing them with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting this premixture at last with water to the desired concentration indicated in the following paragraph. The test has been carried out as follows:

White cabbage has been sprayed drip wet with aqueous emulsions as prepared above in a concentration of 0.1%. Caterpillars (of the type diamondback moth, 10 each) have been placed on the sprayed leaves of the white cabbage. The living status has been determined after 24 hours and 48 hours. The results are as follows: caterpillars are killed completely with 0.1% solutions.

The following examples are given for the purpose of illustrating the present invention.

Example 1

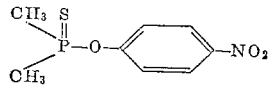

To a solution of 14.1 grams (0.15 mol) of dimethyl-thiol-phosphinite in 75 cc. of methylene chloride are added dropwise, with stirring at 10–15° C., 28.4 grams (0.15 mol) of 4-nitrophenyl-sulfenic acid chloride dissolved in 100 cc. of methylene chloride. The reaction mixture is stirred at room temperature for a further 30 minutes, then washed with water until the reaction is neutral, the organic phase is separated off and dried over sodium sulfate. By addition of petroleum ether the reaction products is caused to crystallize. 24.3 grams (65% of the theoretical) of dimethyl-S-4-nitrophenyl-thionothiolphosphinic acid ester are thus obtained in the form of almost colorless leaflets of M.P. 117.5° C.

By the same way there may be obtained the compounds of the following formulae:

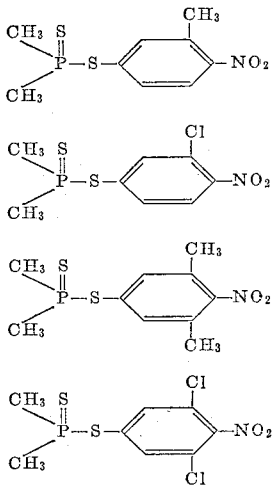

*Example 2*

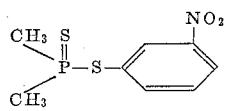

14.1 grams (0.15 mol) of dimethyl-thiol-phosphinite are dissolved in 75 cc. of methylene chloride and 28.4 grams of 3-nitrophenyl-sulfenic acid chloride dissolved in 100 cc. of methylene chloride are added dropwise with stirring at 10-15° C. to the solution thus obtained. The reaction mixture is stirred for a further 30 minutes, washed with water, dried over sodium sulfate and the solvent is finally distilled off under vacuum. The crystalline residue is recrystallized from a mixture of benzene and petroleum ether. Almost colorless crystals, M.P. 5° C., yield 23.5 grams (63% of the theoretical).

Flies and mosquito larvae are killed completely with 0.1% solutions.

By the same way there may be obtained the compound of the following formula

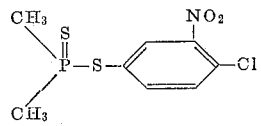

*Example 3*

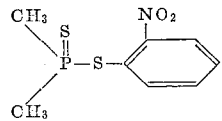

To a solution of 14.1 grams (0.15 mol) of dimethyl-thiolphosphinite in 75 cc. of methylene chloride are added dropwise, with stirring at 10-15° C. 28.4 grams of 2-nitrophenyl-sulfenic acid chloride dissolved in 100 cc. of methylene chloride. After stirring for a further 30 minutes, the mixture is washed with water, dried over sodium sulfate and freed from the solvent under vacuum. 34.5 grams of a yellowish oil remain behind which solidifies soon. After recrystallization from a mixture of methylene chloride and petroleum ether, 27.8 grams (75% of the theoretical) of dimethyl-S-2-nitrophenyl-thionothiolphosphinic acid ester are obtained as pale yellow crystals of M.P. 88.5° C.

Flies are killed completely with 0.1% solutions.

*Example 4*

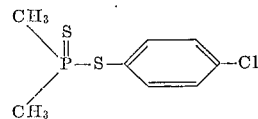

14.1 grams (0.15 mol) of dimethyl-thiolphosphinite dissolved in 75 cc. of methylene chloride are treated dropwise at 10-15° C. while stirring with a solution of 27 grams (0.15 mol) of 4-chlorophenyl-sulfenic acid chloride in 75 cc. of methylene chloride. The reaction mixture is subsequently allowed to react for a further 30 minutes, then washed with water, dried over sodium sulfate and the solvent removed under vacuum. The residue is recrystallized from a mixture of methylene chloride and petroleum ether. 26.4 grams (corresponding to 74% of the theoretical) of dimethyl-S-4-chlorophenyl-thionothiolphosphinic acid ester are thus obtained in the form of colorless needles, M.P. 105° C.

Caterpillars and grain weevils are killed completely with 0.1% solutions.

By the same way there may be obtained the compounds of the following formulae:

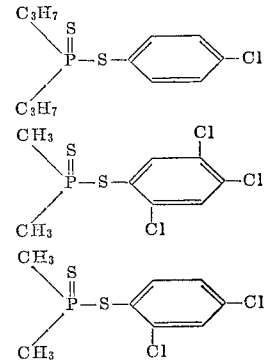

*Example 5*

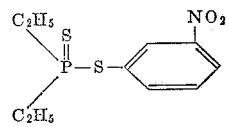

A solution of 18.4 grams (0.15 mol) of diethylthiolphosphinite in 100 cc. of methylene chloride is treated dropwise at 10° C. while stirring with 28.4 grams of 3-nitrophenyl-sulfenic acid chloride dissolved in 100 cc. of methylene chloride. After 30 minutes, the reaction mixture is washed with water, then dried over sodium sulfate and the solvent distilled off under vacuum. As a residue there remain 40.0 grams (97% of the theoretical) of diethyl-S-3-nitrophenyl-thionothiolphosphinic acid ester as a yellowish oil.

Analysis ($C_{10}H_{14}O_2PS_2N$): Calculated: P, 11.25; S, 23.29; N, 5.09. Found: P, 10.75; S, 23.04; N, 4.95.

Mosquito larvae are killed completely with 0.1% solutions.

By the same way there may be obtained the compound of the following formula

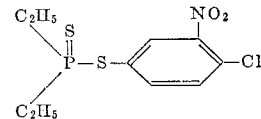

*Example 6*

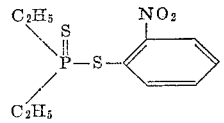

To a solution of 18.4 grams (0.15 mol) of diethyl-thiolphosphinite in 100 cc. of methylene chloride are added dropwise at 10° C. with stirring 28.4 grams of 2-nitrophenyl-sulfenic acid chloride dissolved in 100 cc. of methylene chloride. The reaction mixture is further stirred for 30 minutes, then washed with water and the solvent removed under vacuum. The residue is likewise subjected to distillation and the distillate subsequently treated with ligroin. The precipitated yellowish crystals are filtered off with suction and 32 grams (77% of the theoretical) of diethyl-2-nitrophenyl-thionothiolphosphinic acid ester are thus obtained. M.P. 57–58° C.

Flies and mosquito larvae are killed completely with 0.1% solutions.

By the same way there may be obtained the compound of the following formula

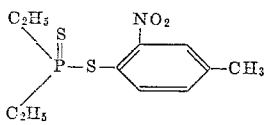

We claim:
1. A compound of the following formula

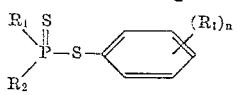

wherein $R_1$ and $R_2$ stand for lower alkyl radicals, whilst $(R')_n$ denotes a member selected from the group consisting of lower alkyl groups, nitro groups and halogen atoms, $n$ being 1, 2, 3, 4 and 5.
2. A compound of claim 1 wherein R' is lower alkyl.
3. A compound of claim 1 wherein R' is nitro.
4. A compound of claim 1 wherein R' is halogen.
5. The compound of the following formula

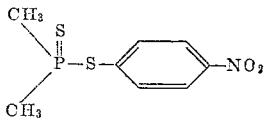

6. The compound of the following formula

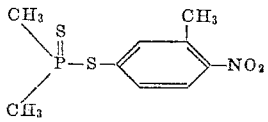

7. The compound of the following formula

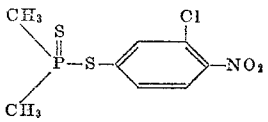

8. The compound of the following formula

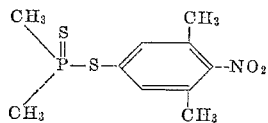

9. The compound of the following formula

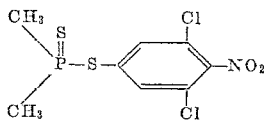

10. The compound of the following formula

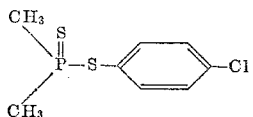

11. The compound of the following formula

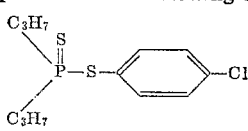

12. The compound of the following formula

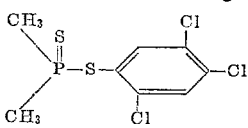

13. The compound of the following formula

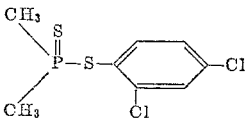

14. The compound of the following formula

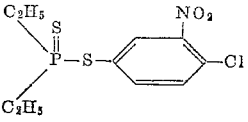

References Cited by the Examiner
UNITED STATES PATENTS

| | | | |
|---|---|---|---|
| 2,274,291 | 2/1942 | Clayton et al. | 260—461.109 |
| 2,967,884 | 1/1961 | Dunn et al. | 260—461.109 |

FOREIGN PATENTS

| | | |
|---|---|---|
| 1,227,473 | 3/1960 | France. |

CHARLES B. PARKER, *Primary Examiner.*

MORRIS LIEBMAN, IRVING MARCUS, JOSEPH H. BRUST, *Examiners.*